United States Patent [19]

Davis

[11] 4,015,820

[45] Apr. 5, 1977

[54] WORK LIFTING AND SUPPORTING DEVICE

[76] Inventor: Elbert W. Davis, 1090 Boiling Springs Road, Spartanburg, S.C. 29303

[22] Filed: Sept. 17, 1975

[21] Appl. No.: 614,346

[52] U.S. Cl. ................................ 254/4 B; 254/127

[51] Int. Cl.[2] ........................................ B60P 1/14

[58] Field of Search ............ 254/4 R, 4 B, 4 C, 47, 254/127

[56] References Cited

UNITED STATES PATENTS

| | | | |
|---|---|---|---|
| 3,313,521 | 4/1967 | Sauka | 254/4 B |
| 3,338,556 | 8/1967 | Sluse | 254/134 |
| 3,559,981 | 2/1971 | Abshear | 254/134 |
| 3,931,957 | 1/1976 | Thibodeaux | 254/127 |

FOREIGN PATENTS OR APPLICATIONS

| | | | |
|---|---|---|---|
| 174,021 | 3/1976 | Austria | 254/4 C |

*Primary Examiner*—Al Lawrence Smith
*Assistant Examiner*—Robert C. Watson
*Attorney, Agent, or Firm*—Wellington M. Manning, Jr.

[57] ABSTRACT

A device is disclosed and claimed herein for lifting and supporting large items requiring repair, assembly, installation, disassembly or the like. A bumper of an automobile, a door of an automobile, an automobile body panel or the like are exemplary of workpieces that may be handled by the present unit. Such items may be temporarily secured to the device of the present invention and then elevated or lowered to a proper position for assembly, disassembly, installation and/or repair of the item. Particular chain drive means permits accurate adjustment of the workpiece to a desired location for the intended operation. Means for holding the workpiece are being generally universally adjustable to properly position the work as desired. Remote switching permits operation of the device from beneath an automobile or elsewhere away from the device.

20 Claims, 8 Drawing Figures

WORK LIFTING AND SUPPORTING DEVICE

BACKGROUND OF THE INVENTION

Work in body shops and garages to repair automobiles that have been wrecked or otherwise damaged often requires the physical handling of portions of the automobile that are quite heavy such as doors, bumpers or the like. It is normally necessary to employ several people for the proper handling of these heavy items during assembly or disassembly thereof. Even with several persons assisting, a large bumper weighing in the neighborhood of 350 pounds, dictates an inordinate amount of lifting. Moreover, the two or three persons must hold the workpiece in position through assembly or disassembly during periods when the workpiece is not supported by the portion of the automobile to which it is secured. Intricacies of body design detract from ease of assembly. Hence, close working areas are often encountered during assembly or disassembly of the work. All of these situations involve the use of several people in a job that remains dangerous. If one drops the workpiece, an arm, leg or other body portion may be severely damaged. Likewise, the sheer energy required to lift and hold the workpiece distracts from the job and may cause labor problems.

Not only is the manual manipulation of heavy automotive body parts awkward and dangerous, but use of the large number of persons merely for manual handling is very costly. The extra personnel are not needed during the actual repair function, but only during disassembly and replacement of the body part. In the interim, these people can perform other tasks. If no other tasks are available during this work interim, in effect, these laborers add to the overall cost of the repair without performance of any services during the repair function.

Prior attempts have been made to develop equipment for the handling of heavy component parts of an automobile or other items. Such devices have been developed in an attempt to avoid the need for extra personnel for manual manipulation of the workpiece. Prior attempts, for the most part, have not been successful for various and sundry reasons. Equipment previously produced has been generally restrictive insofar as the particular workpieces that may be handled thereby. Additionally, cost of the prior art attempts has been prohibitive in certain situations. Further, certain prior art devices have not even functioned in the intended manner to overcome the need for manual handling of the components.

The present invention affords a device that overcomes disadvantages of the prior art mentioned above. Specifically, the device of the present invention may be used as a jack for lifting one end of an automobile assuming the structural and operative components of the device possess the requisite strength. Normal use of the device of the present invention, however, is not as a jack, but as a means to support and hold heavy items, such as bumpers, doors and the like of an automobile while necessary work may be performed thereon. Furthermore, the device of the present invention is suitable to support the workpiece during assembly or removal of the component parts.

The prior patented art is devoid of any teaching or suggestion of the device of the present invention. Exemplary of the prior art are U.S. Pat. Nos. 2,413,242 to Murray; 3,030,103 to Allen et al.; 3,220,565 to Wells, and 3,850,409 to Davis et al.

SUMMARY OF THE INVENTION

It is an object of the present invention to provide a device for lifting and supporting a heavy workpiece.

Another object of the present invention is to provide a device for lifting and supporting component parts of an automobile at a particular location to permit work to be conveniently performed thereon.

Still another object of the present invention is to provide a unique device for holding large component parts of an automobile, while permitting minute variation of same to facilitate ease of attachment and/or detachment thereof.

Yet another object of the present invention is to provide a device to permit the handling of a heavy workpiece such as an automobile bumper by but one person.

Generally speaking, the present invention comprises a device for lifting and holding a workpiece comprising a frame; chain drive means associated with said frame; a reversible power source associated with said chain drive means to provide vertical movement thereto; a support member secured to said chain drive means for vertical movement therewith; a pair of support arms associated with said support member at opposite ends thereof; work securing means associated with said support arms to secure work thereto; and switch means electrically associated with said power source to actuate said power source for adjustment of said support member in the desired direction.

More specifically, the device of the present invention comprises a wheeled frame whereby the device may be moved around with respect to the workpiece or with the workpiece being held thereon. In this fashion, the workpiece can be positioned for precise adjustment during attachment or removal of the workpiece with respect to the automobile body or whatever its main body may be. The frame per se of the lifting device can be constructed of materials that are dictated by the intended use thereof. In general, the frame structure would be constructed according to intended use of the unit. Certain materials would be utilized for a frame that is designed for lifting and holding only component parts, while a much heavier and/or stronger frame would be provided on a unit that is also designed for lifting an end of the entire automobile in the manner of a conventional jack. In addition to frame considerations, other components such as the drive motor, the chain and the like must also be taken into account to insure that the expected weight load may be safely handled.

The chain drive means is preferably powered by an electric motor with a worm gear arrangement having a drive pulley on each end of a shaft such that two chains are deployed at opposite ends of the drive shaft. The two drive chains are aligned in a vertical plane along the front area of the frame. A portion of the frame adjacent the drive chain track is provided with a vertical guideway which receives a guide associated with the chain drive for up and down movement therewith. Roller guides are generally mounted on a member secured to a workpiece lifting means. The roller guides are received along the guideway and hold the lifting means in proper alignment at all times. Preferably, members with the roller guides are received along guideways at both ends of the frame.

The lifting means that is guided during vertical movement along said guideways has a pair of outwardly extending arms associated therewith, preferably in such manner to permit adjustment of the arms with respect to the lifting means in general. The arms on each end of the lifting means may be moved in and out so as to provide the desired width of lifting means for receiving a workpiece thereon. While other arrangements may be employed, a preferred arrangement finds a cross or horizontal tubular member with like shaped tubular arm supports telescopingly received within same. The tubular arm supports may be moved in and out of the tubular member and secured at any length therealong. Set screws or other suitable means are provided for securing the support arms at any desired width.

The support arms preferably utilize a member extending in a direction outwardly from the cross tubular member with a similar portion extending generally upwardly therefrom, both of which are equippled with rubber or like resilient material to prevent slippage of and/or damage to the workpiece. Directly behind the arms at opposite sides of the frame are flexible securing means that may be affixed at one end to the arm or some portion of the lifting means and at an opposite end to the workpiece. The securing means may be tensioned to hold the workpiece snugly against the support arms. A rachet arrangement in connection with a cable and hooks at a terminal end thereof adequately affords this flexible securing means.

A lever pivot rod is preferably secureable to a portion of the lifting means intermediate the width of same. The rod may be used to pivot the lifting means at an upward end of its vertical traverse to position the workpiece generally atop the frame. Adjustable T-bars on top of the frame may reside against the underside of the workpiece to add stability to the workpiece atop the frame. In this fashion, the workpiece may be better handled in certain situations during performance of the desired work thereon.

DESCRIPTION OF THE PREFERRED EMBODIMENTS

Figure 1:
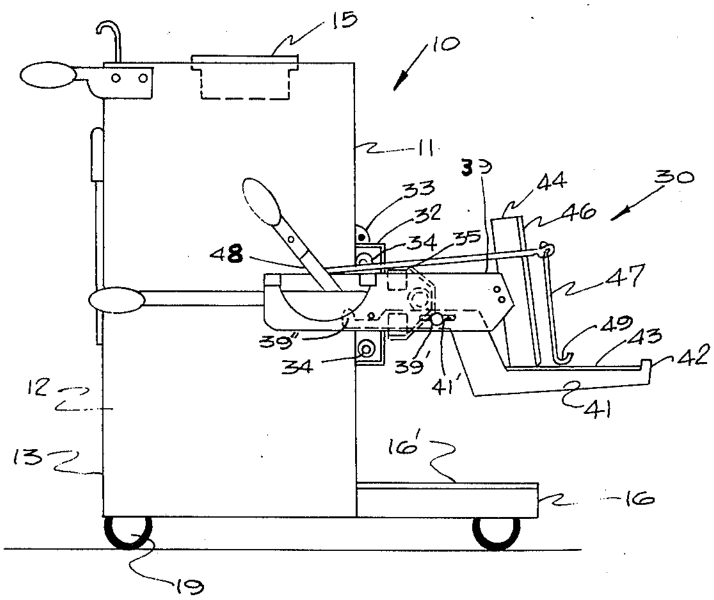
FIG. 1 is a side elevational view of a lifting and holding device according to the teachings of the present invention.

Referring to the Figures, preferred embodiments of the present invention will now be described in detail. Making reference to FIGS. 1 through 4, the device of the present invention will now be described in detail. A frame generally indicated as 10 is fabricated from sufficient structural members to support a load for which the unit is designed to lift and hold. Frame 10 may further be provided with a front wall 11, side walls 12 and 14, a rear wall 13 and a top 15. Obviously, such structural members as desired may be utilized to afford the necessary structural strength for frame 10 and panels or the like may be secured thereto to constitute the various unit walls identified above. Protruding outwardly from front wall 11 at a lower end thereof are a pair of horizontal members or legs 16 and 17 which are provided with a resilient material such as strips 16' and 17' respectively, along the top of same. Horizontal legs 16 and 17 afford a lower rest support for a workpiece, when necessary.

Among the support elements for frame 10 are a pair of vertical elements 18 located adjacent front wall 11 that serve an additional purpose of providing a vertical guideway for the lifting and holding means, generally indicated as 30 of the device of the present invention. Vertical guideways 18 insure proper alignment of lifting and holding means 30 at all times, and will be described in more detail hereinafter in conjunction with a detailed description of lifting means 30. Frame 10 is also preferably provided with a plurality of casters 19 secured to frame 10 to afford mobility thereto. Furthermore, a container 15' is removably received atop frame 10 in top wall 15 in a like sized opening in wall 15. Container 15' may be used for storage of tools, nuts, bolts and the like that may be required during work on a workpiece. Handles H are also appropriately secured to frame 10 and are used to move the unit around a workshop to a desired location.

Figure 2:
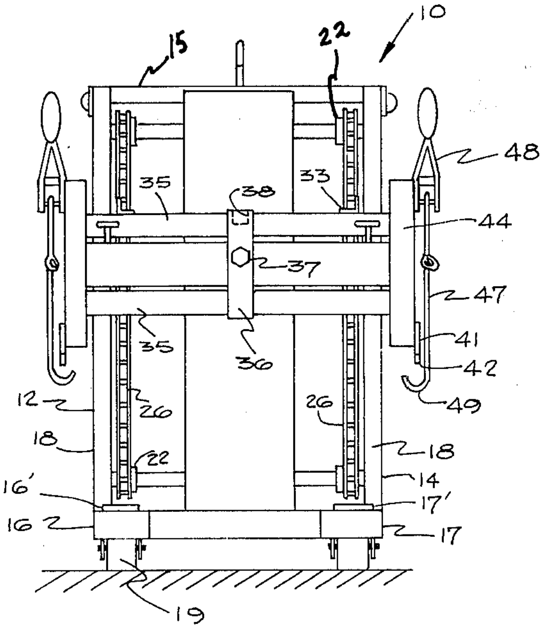
FIG. 2 is a front elevational view of the device as shown in FIG. 1.
Figure 3:
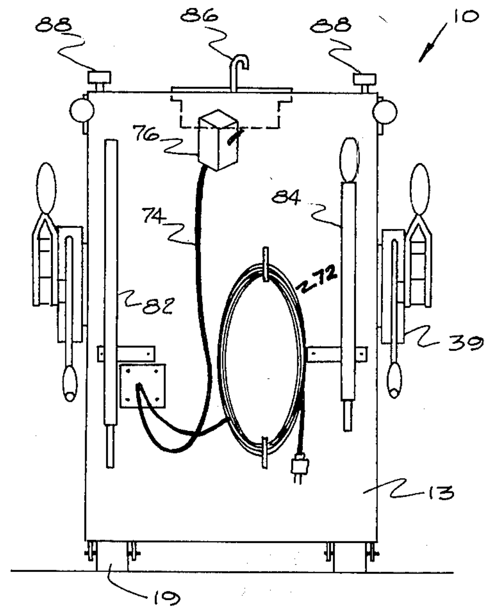
FIG. 3 is a rear elevational view of the device as shown in FIG. 1.
Figure 4:
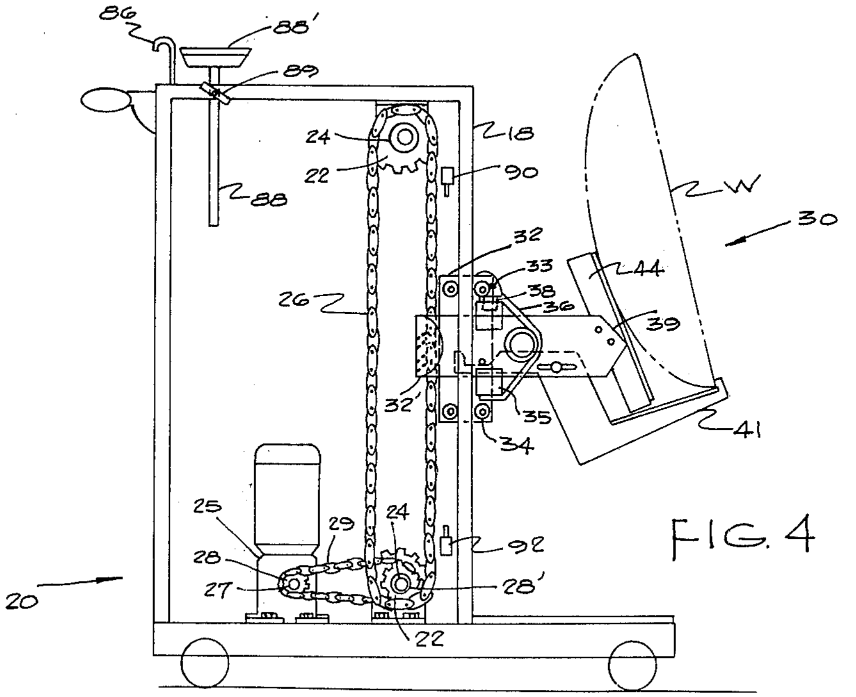
FIG. 4 is a vertical cross sectional view of the device as shown in FIG. 2 taken along a line IV—IV.

A chain drive means generally indicated as 20 is illustrated in FIGS. 2 and 4 associated with the lifting and holding unit. Pulleys 22 are received on shafts 24 that are journaled for rotation to frame 10. Pulleys 22 define the upper and lower travel path for lifting means 30. Link chains 26 or the like are received around pulleys 22, as best illustrated in FIGS. 2 and 4, and are rigidly secured to lifting means 30 as will be described in more detail hereinafter. Movement of chain 26 in either direction thereby causes a like movement of lifting means 30. An electric, reversible motor 25 is secured in suitable fashion to frame 10 and has a drive shaft 27 extending outwardly therefrom. A drive pulley 28 is secured around shaft 27 and is associated with a transfer pulley 28' that is received along lower shaft 24 by a second, short drive chain 29. Rotation of shaft 27 as dictated by the direction of rotation of motor 25 imparts movement to second drive chain 29 which rotates shaft 24. Rotation of lower shaft 24 causes vertical drive chain 26 to move around its closed path with lifting means 30 moving appropriately therewith.

Lifting means 30 as shown in FIGS. 1 through 6 is generally arranged as follows. One or more struts form a base 31 for lifting means 30. A stabilizer plate 32 is secured at each end of base 31. Each stabilizer plate 32 has guide means 34, exemplified by rollers, received thereon for guiding contact along guideways 18 of frame 10. Four guide rollers 34 are preferably provided for each plate 32, two of such rollers being located on each side of guideway 18. A pivot connector 33 is further provided atop each plate 32 with the remainder of lifting means 30 to be described being connected thereto for pivotal movement therearound. Specifically, one or more horizontal members 35 are pivotally secured at connector 33. Horizontal members 35 are secured together by a strip 36 with one member 35, generally a front central member being pivotally secured to strip 36 around a pivot point 37. In FIGS. 1 through 6, the front central member 35 is round in cross section and telescopingly receives smaller horizontal members 35' at each end. Smaller horizontal members 35' may be moved in and out of central member 35 to properly adjust the width of lifting means 30 as desired. Once at a proper position, the horizontal members 35 and 35' may be secured by a set screw 40 or the like. Lifting means 30 further has a threaded opening 38 located along the top of same, on one of the horizontal supports 35, for example, to receive a pivot rod 82 and extension rod 84 and permit lifting means 30 to be pivoted about pivot connector 33 with a workpiece secured thereon. Extension rod 84 may be added to pivot rod 82 for pivoting lifting means 30 to provide better leverage. Once pivot rod 82 is approximately parallel with top 15 of frame 10, hook 86 may be brought into position over rod 82 to catch and hold rod 82. Extension rod 84 can then be disconnected therefrom and returned to its clip holders 84' on rear wall 13 of frame 10. Lifting means 30 is thus held in the pivoted position to properly position workpiece W in the desired position. In the upward, pivotal position atop frame 10, workpiece W may rest on one or more adjustable T-bars 88 provided atop frame 10 to stabilize workpiece W at that location. Preferably, two or more T-bars 88 are provided that are adjustable for up and down movement through an appropriate opening in frame 10 and are held in any desired position by a set screw 89 or the like. As with other workpiece contact surfaces, a resilient pad 88' is preferably secured to the contact surface of T-bars 88.

Telescopic horizontal supports 35' are provided with end plates 39 to which are secured lift arms 41 and back rests 44. A slot 41' is provided in a portion of lift arm 41 and receives a bolt 39' or the like from end plate 39 for support thereat. At a rearward end of lift arm 41 a stud 39'' is provided on end plates 39 so as to maintain stability therefor. In this fashion, lift arm 41 may be moved axially forward and rearward with respect to end plates 39 to properly orient same for receipt of a workpiece W. Telescopic horizontal supports 35' are held in a proper position with respect to main horizontal support 35 by set screws 40 or the like. In this fashion, the distance between lift arms 41 may be varied as mentioned to receive the particular workpiece. Back rests 44 and lift arms 41 are provided with resilient pads 43 and 46 respectively, whereby workpiece W can be received thereon without any damage thereto, and further to lessen any chance of slippage of workpiece W on arms 41. Lift arms 41 are provided with a small lip 42 at a forward end thereof so as to further provide a barrier against slippage of the workpiece off the forward end of lift arm 41. Lip 42 also is often used to engage a particular portion of workpiece W during lifting.

A workpiece tie down means 47 is also provided on end plates 39. A cable which has a hook 49 at a terminal end thereof is quite suitable. Cable 47 is preferably secured to a rachet 48 or other tension producing means and passes through a series of guides to the front of lifting means 30. With a workpiece W resting on lift arm 41 and perhaps against back rest 44, hook 49 can be attached to an appropriate portion of the workpiece. Rachet 48 can then be turned to apply tension on cable 47 which secured workpiece W to arms 41.

Figure 5:
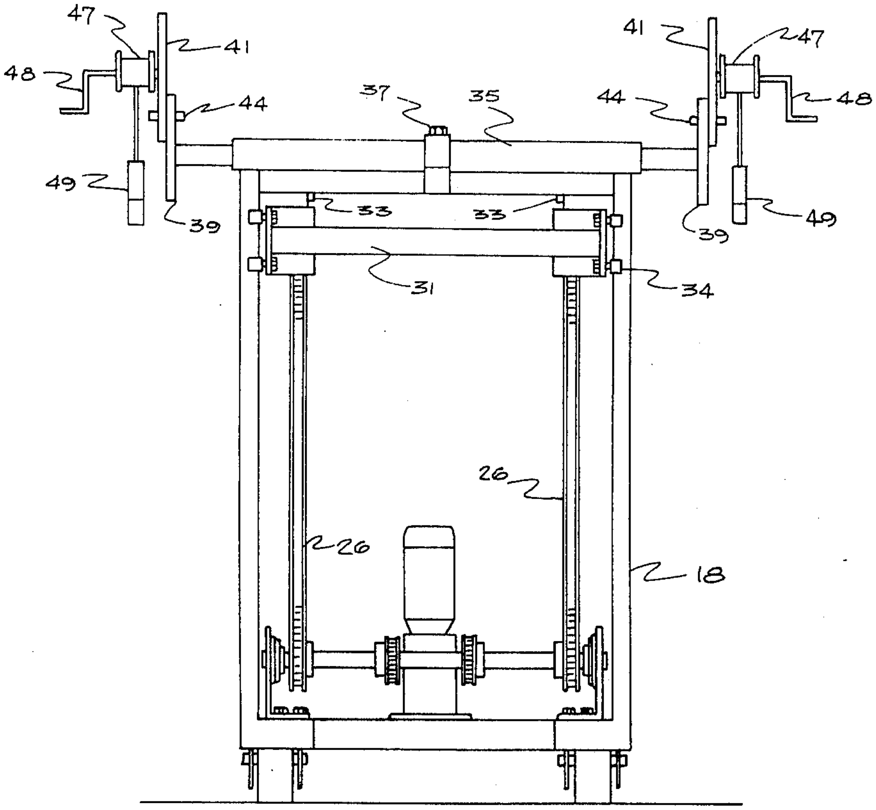
FIG. 5 is a frontal elevational view of the device of the present invention with the lifting means pivoted atop the frame.
Figure 6:
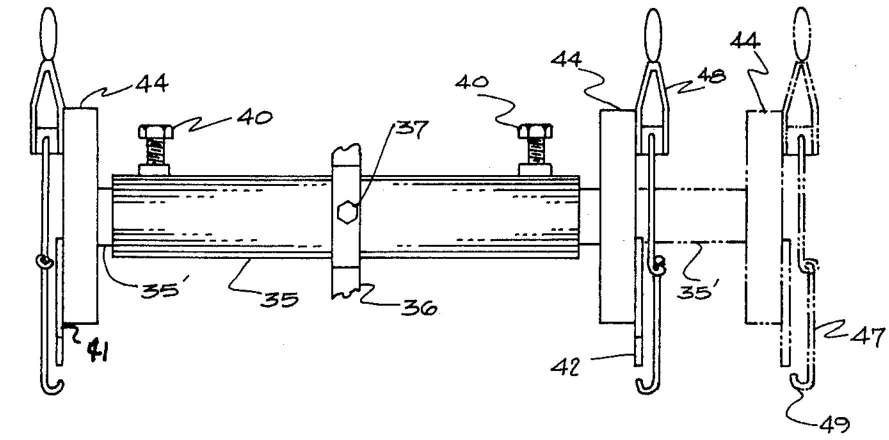
FIG. 6 is an enlarged view of a lifting means of the present invention as illustrated in the Figures, showing further features thereof.

As can best be seen in FIGS. 4 and 5, frame 31 for lifting means 30 is provided with a plurality of guide rollers 34 on plate 32 to rotate along opposite sides of vertical guideway 18. Each plate 32 further has a yoke 32' that is rigidly secured to drive chain 26. There is thus a direct movement of lifting member 30 with appropriate movement of drive chain 26. The entire lifting and holding section 30 is thereby moved up and down with chain 26 to the desired location. Lifting and holding means 30 may require movement of only a fraction of an inch to disengage a workpiece W from an automobile, or to accurately position the workpiece for assembly to an automobile, or may require movement of one or more feet in a vertical plane. A length of power cable 74 is preferably electrically connected to drive motor 25 to permit remote operation of the unit of the present invention. A switch 76 is provided at a terminal end of cable 74 and may be used to closely control operation of motor 25 to move lifting means 30 in either direction. Switch 76 can be carried beneath an automobile, for example, to permit minute vertical adjustment of a workpiece W which has been secured to the unit of the present invention.

A pair of limit switches 90 and 92 are positioned at the upper and lower ends respectively of the vertical path of travel of lifting means 30. Once contact is made with either limit switch 90 or 92, power to drive motor 25 is interrupted and lifting means 30 stops and holds at the switch. Safety precautions are incorporated into the unit of the present invention to prevent a workpiece from excessive movement in an upward or downward direction.

Figure 7:
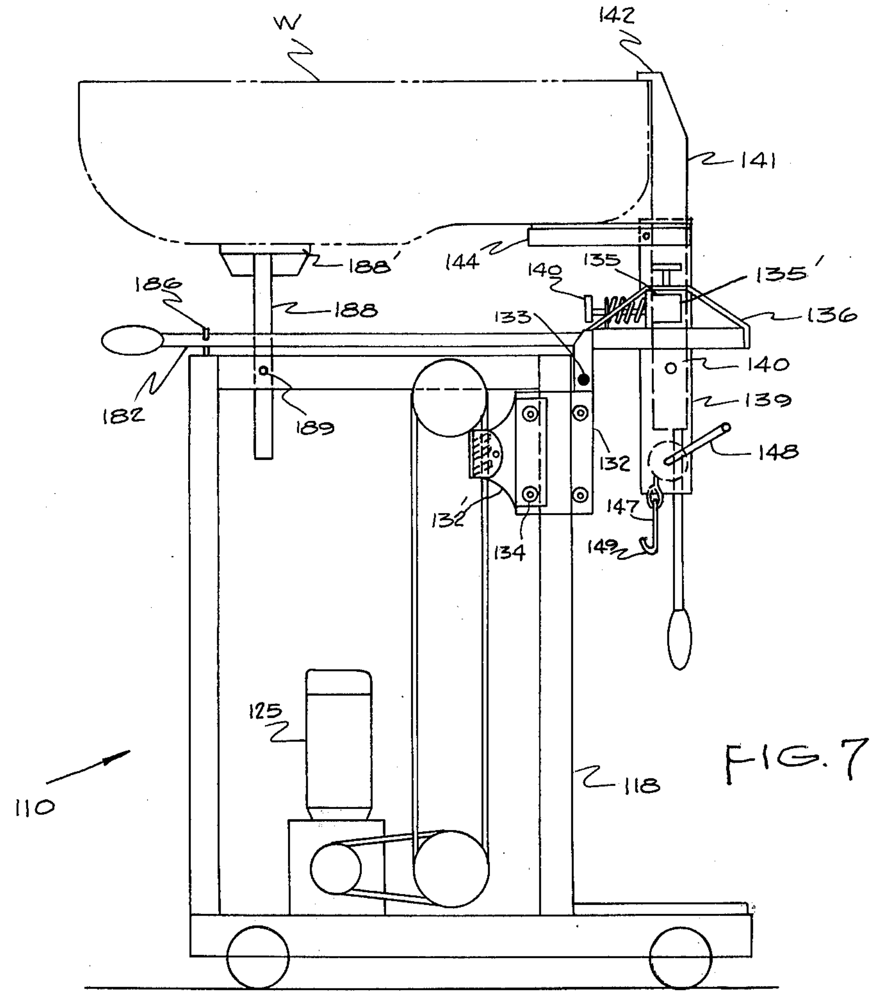
FIG. 7 is a vertical cross sectional view of a lifting and holding device according to the present invention illustrating further lifting means embodiments thereof.
Figure 8:
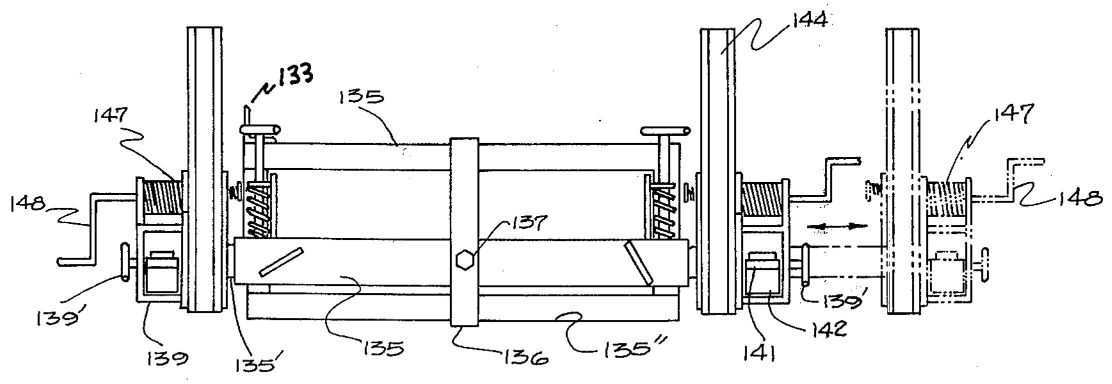
FIG. 8 is an enlarged view of the further embodiment of the lifting means of the present invention as illustrated in FIG. 7.

FIGS. 7 and 8 illustrate a further embodiment of a lifting and holding means 130 according to the teachings of the present invention. A horizontal support 135 is illustrated as rectangular in cross section and is provided with like shaped, but smaller extensions 135' in opposite ends thereof. A strap 136 passes around front element 135 to rear horizontal support elements that form a base 131. Plates 132 with a plurality of guide rollers 134 are secured to base 131 with the rollers residing on opposite sides of a vertical guideway 118 of frame 110 to insure stability during vertical movement of lifting and holding members generally indicated as 130. Horizontal members 135 are pivotally secured to plates 132 at pivot connectors 133. On opposite ends of horizontal slides 135' are end sleeves 139 that likewise are rectangular in shape and receive similarly shaped, but smaller lifting elements 140 that possess lifting arm 141 at an end thereof. A set screw 139' may be loosened and tightened as desired so as to move member 140 in and out of sleeve 139 to properly position lifting arm 141 at the workpiece W. Lifting arm 141 has a lip 142 at an outer end thereof as was described with respect to the lifting arm 41 of FIGS. 1 through 6. Likewise, a back rest 144 is provided that is pivotally secured to side sleeves 139. A holding cable 147 is provided atop side sleeve 139 and is provided with a hook 149 at an end thereof. Instead of a rachet arrangement as was illustrated with respect to the prior Figures, a single turn crank 148 is provided having latch means thereon for properly applying tension to cable 147 to secure the workpiece W on the holding means 130. In FIG. 7, the lifting means 130 is shown pivoted about its pivot connector 133 on plate 132 whereby workpiece W (shown in phantom) is located atop the unit. T-bars 188' have been adjusted upwardly so as to receive workpiece W in a level manner as illustrated. In FIG. 8, a pivot point 137 is provided at strap 136 about which horizontal member 135 may pivot in a vertical plane. Spring loaded screws 137' are provided at opposite ends of horizontal support member 135 to afford spring tension to same and prevent a loose pivotal action around pivot point 137.

With the unit as described hereinabove, a user can position the lifting and holding means 30 in the down position with the lifting arms being approximately horizontal. The unit can then be manually pushed to a proper location for receipt of a door, bumper assembly, or the like. Switch 76 may be actuated to raise lifting means 30 and apply some pressure on workpiece W. Workpiece W can then be disassembled from the vehicle and cable 47 passed around a portion of same with hook 49 becoming attached thereto. Tensioning of cable 47 will then hold workpiece W securely on lifting means 30. Lifting means 30 can then be lowered to remove any pressure at the point of attachment of workpiece W to the vehicle and unit 10 may be withdrawn from the vehicle, supporting the workpiece W in a desired manner. Once unit 10 is away from the vehicle and at a desired location, workpiece W may be raised or lowered to a particular height by actuation of switch 76. At the top of vertical movement of lifting means 30, limited by limit switch 90 (See FIG. 4), pivot rod 82 may be inserted into opening 38 and lifting means 30 may be pivoted about its pivot connectors 33 to position workpiece W atop the unit 10. Pivot rod 82 is received and held under hook 86. Once work has been completed on workpiece W, workpiece W may be returned to an approximate position of installation onto the vehicle, unit 10 is moved into proper location. With the switch 76 then being in proper placement according to the dictates of the user, the lifting means 30 may be inched upwardly or downwardly to permit proper installation of the workpiece W. Limit switch 92 provided at a lower end of travel precludes excessive downward movement of lifting means 30.

In the above described fashion, the unit of the present invention may be employed to provide a better handling situation for a heavy and/or bulky workpiece. Obviously, as mentioned above, the structural strength of the unit is determined by the component parts of same as to total weight that may be handled thereby.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A device for lifting and supporting a workpiece comprising:

a. a frame;
b. chain drive means associated with said frame;
c. a power source associated with said chain drive means to provide vertical movement thereto;
d. a support section secured to said chain drive means; said support section having guide means pivotally connected thereto and cooperating with a portion of said frame, said support means further comprising a first horizontal member, second horizontal members associated with said first horizontal member for axial adjustment with respect thereto, and a support arm associated with each said second horizontal member, said support arms being capable of adjustment transverse to the length of said horizontal members;
e. workpiece securing means associated with said support frame to secure a workpiece thereto; and
f. switch means associated with said power source to actuate said power source for adjustment of said support section in a desired vertical direction.

2. A device as defined in claim 1 wherein said support section is mounted for upward pivotal movement about said guide means.

3. A device as defined in claim 1 wherein said support means have a lip at an outer end thereof, and wherein further a back rest is pivotally secured to said support section adjacent said arms.

4. A device as defined in claim 1 wherein said support arm is telescopingly received in an element secured to an end of said second horizontal members.

5. A device as defined in claim 1 wherein said second horizontal members are telescopingly associated with said first horizontal member.

6. A device for lifting and supporting a workpiece comprising:

a. a frame;
b. chain drive means associated with said frame;
c. a power source associated with said chain drive means to provide vertical movement thereto;
d. a support section secured to said chain drive means, said support section comprising a first horizontal member, a pair of second horizontal members telescopingly associated with said first horizontal member for axial adjustment with respect thereto, and a support arm located at an outer end of said second horizontal members, said support arms being mounted for adjustment in a direction transverse to said second horizontal members;
e. guide means pivotally secured to said support section and cooperating with a portion of said frame to guide said support section in vertical movement and permitting said support section to pivot therearound at an upper portion of vertical movement; and
f. switch means for actuation of said power source.

7. A device as defined in claim 6 wherein a plate is secured to an outer end of said second horizontal members and said support arm is adjustably secured thereto.

8. A device as defined in claim 6 wherein a tubular element is secured to an outer end of each second horizontal member and said support arm is telescopingly received therein.

9. A device as defined in claim 6 wherein support arms have a lip at a forward end thereof and wherein a back rest is pivotally associated therewith adjacent said horizontal members.

10. A device for lifting and supporting a workpiece comprising:

a. a frame;
b. chain drive means associated with said frame;
c. a power source associated with chain drive means to provide vertical movement thereto;
d. a support section secured to said chain drive means, said support section comprising a horizontal member with support arms provided at opposite ends thereof, said arms being adjustable with respect to said horizontal members;
e. guide means pivotally secured to said support section and cooperating with a portion of said frame to guide said support section in vertical movement and permitting said support section to pivot therearound at an upper portion of vertical movement; and f. switch means operatively associated with said power means.

11. A device as defined in claim 10 wherein a member is secured to each end of said horizontal member and said support arm is adjustably secured thereto.

12. A device as defined in claim 10 wherein a tubular element is secured to each end of said horizontal member and said support arm is telescopingly received therein.

13. A device as defined in claim 10 wherein said support arm has a lip at a forward end thereof.

14. A device as defined in claim 10 including further workpiece securing means associated with said support area for securing a workpiece thereto.

15. A device for lifting and supporting a workpiece comprising:

a. a frame, said frame having a vertical guideway along each side thereof;

b. a lifting means associated with said frame for vertical movement along said guideways, said lifting means comprising a base, said base having a plate at each end thereof, said plates having guide means thereon that cooperate with said vertical guideways of said frame for guiding of said lifting means, a horizontal member pivotally associated with said plates, said horizontal member having a smaller member telescopingly received in each end thereof, said smaller members having lifting arms, back rests, and work securing means secured at an outer end thereof;

e. chain drive means secured to said frame and defining a vertical path of travel thereat, said chain drive means being further rigidly secured to said lifting means; and d. a power source for said chain drive means, said power source having remote switching means associated therewith, said power source further having limit switches electrically connected thereto, said switches being positioned at the top and bottom of said path of travel of said lifting means.

16. A device as defined in claim 15 wherein the power source is an electric motor and the chain drive means comprises two chains geared to a drive shaft of said motor.

17. A device as defined in claim 15 wherein said chain drive means comprises two drive chains located on opposite sides of said power source, each of said drive chains being rigidly secured to said lifting means.

18. A device as defined in claim 17 wherein said arms are secured to a telescoping member from said horizontal member, said arms being adjustable with respect to said telescoping member.

19. A device as defined in claim 18 wherein said telescoping member further has a back rest secured thereto adjacent said arms.

20. A device as defined in claim 19 wherein said work securing means is a cable with a hook at a tensioned end thereof.

* * * * *